(12) United States Patent
Wang et al.

(10) Patent No.: US 9,250,002 B2
(45) Date of Patent: Feb. 2, 2016

(54) SYSTEM AND METHOD FOR CONTROLLING AN ABSORPTION CHILLER CONFIGURED TO SIMULTANEOUSLY PRODUCE COOLING AND HEATING

(75) Inventors: Jiachuan Wang, Chaper Hill, NC (US); Chaohong Cai, Weatogue, CT (US); Ahmad M. Mahmoud, Bolton, CT (US); Junqiang Fan, Glastonbury, CT (US); Richard L. Martin, Cicero, NY (US); John F. Boardman, Manchester, CT (US); Timothy C. Wagner, East Hartford, CT (US)

(73) Assignee: CARRIER CORPORATION, Farmington, CT (US)

( * ) Notice: Subject to any disclaimer, the term of this patent is extended or adjusted under 35 U.S.C. 154(b) by 671 days.

(21) Appl. No.: 13/405,823

(22) Filed: Feb. 27, 2012

(65) Prior Publication Data

US 2012/0216552 A1 Aug. 30, 2012

Related U.S. Application Data

(60) Provisional application No. 61/447,366, filed on Feb. 28, 2011.

(51) Int. Cl.
*F25B 29/00* (2006.01)
*F25B 49/04* (2006.01)
(Continued)

(52) U.S. Cl.
CPC ............... *F25B 49/043* (2013.01); *F24D 3/18* (2013.01); *F24H 4/02* (2013.01); *F25B 29/006* (2013.01); *F24D 2200/126* (2013.01); *Y02B 30/12* (2013.01)

(58) Field of Classification Search
CPC ....... F24H 4/02; F24D 3/18; F24D 2200/126; F25B 29/006; F25B 49/043; Y02B 30/12
USPC .................. 62/103–105, 141, 146–148, 159; 236/1 C, 78 D; 700/44, 45
See application file for complete search history.

(56) References Cited

U.S. PATENT DOCUMENTS 3,837,174 A * 9/1974 Miyagi et al. ................... 62/141
4,187,543 A 2/1980 Healey et al.
(Continued)

FOREIGN PATENT DOCUMENTS

WO 9843025 10/1998
WO 2008127229 10/2008

*Primary Examiner* — Marc Norman
*Assistant Examiner* — Paolo Gonzalez
(74) *Attorney, Agent, or Firm* — Cantor Colburn LLP

(57) ABSTRACT

A system for controlling an absorption chiller includes feedback control loops determining adjustments to system cooling and heating capacities and a controller for simultaneously adjusting positions of an energy input valve, a hot water valve, and a chilled water valve. The controller adjusts valves based on desired adjustments to system cooling and heating capacities and performance maps characterizing relationships between cooling capacity and heating capacities and valve positions. A method for controlling an absorption chiller includes the step of obtaining a performance map characterizing heat energy input to cooling and heating loops as functions of valve positions. To obtain the map, the hot water valve is held in a substantially constant position while the chilled water valve is modulated. Similarly, the hot water valve is modulated while the chilled water valve is held in a substantially constant position.

5 Claims, 3 Drawing Sheets

(51) Int. Cl.
*F24H 4/02* (2006.01)
*F24D 3/18* (2006.01)

(56) References Cited

U.S. PATENT DOCUMENTS

| | | | |
|---|---|---|---|
| 4,373,347 A * | 2/1983 | Howell et al. | 62/112 |
| 5,216,896 A * | 6/1993 | Uchida et al. | 62/148 |
| 5,282,369 A * | 2/1994 | Ohuchi et al. | 62/476 |
| 5,289,868 A | 3/1994 | Koseki et al. | |
| 5,423,189 A | 6/1995 | Nicol et al. | |
| 5,557,939 A | 9/1996 | Mizukami et al. | |
| 5,619,859 A * | 4/1997 | Takigawa et al. | 62/148 |
| 5,732,569 A * | 3/1998 | Sanada et al. | 62/481 |
| 5,916,251 A | 6/1999 | Sibik | |
| 6,305,182 B1 * | 10/2001 | Gupte et al. | 62/324.2 |
| 6,598,420 B2 | 7/2003 | Gupte | |
| 6,658,870 B1 | 12/2003 | Jenkins | |
| 6,742,347 B1 | 6/2004 | Kolk et al. | |
| 2011/0144813 A1* | 6/2011 | Agahi | 700/282 |

* cited by examiner

FIG. 3

320 Determine Valve Position

330 Issue valve position commands

340 Obtain Desired Inputs

350 Integrate controllers

310 Obtain Performance Maps

311 Set all valves to initial positions

312 Operate chiller

313 Acquire chiller data

314 Adjust Valve 1 position

315 Repeat 312 to 314 over V1 range

316 Adjust Valve 2 position

317 Repeat 312 to 316 over V2 range

318 Adjust Valve 3 position

319 Repeat 312 to 318 over V3 range

300

SYSTEM AND METHOD FOR CONTROLLING AN ABSORPTION CHILLER CONFIGURED TO SIMULTANEOUSLY PRODUCE COOLING AND HEATING

CROSS REFERENCE TO RELATED APPLICATIONS

This application claims the benefit of U.S. provisional patent application Ser. No. 61/447,366 filed Feb. 28, 2011, the entire contents of which are incorporated herein by reference.

BACKGROUND OF THE INVENTION

It is recognized that absorption cooling can be an effective means for using heat output from a turbine to provide heating and/or cooling to condition the air of a building, and a number of absorption cooling systems currently exist to provide a combination of cooling, heating and power. Such systems are known as tri-generation systems. As shown in FIG. 1, an exemplary tri-generation system 100 includes a chilled water circuit 110, a cooling water circuit 120, a hot water circuit 130, and a circuit 140 for receiving exhaust energy from a turbine-generator 150. This exemplary system also includes an internal refrigerant loop 160 for transferring heat among the cooling water 120, the chilled water 110, and the hot water 130 circuits.

In attempting to provide a control for absorption chillers such as the tri-generation system of FIG. 1, those skilled in the art have implemented a set of control valves so as to modulate flow rates in the system's various circuits. For example, in the illustrated system, energy input valve 141 can be used to control the heat input to the system by controlling the rate of flow of turbine exhaust gas in the exhaust gas circuit. Similarly, hot water valve 131 can be used to control the rate at which heat from the exhaust gas circuit is transferred to the hot water circuit (i.e., the heating loop) by modulating the rate of flow of refrigerant through the heating loop. Finally, chilled water valve 121 can be used to control the rate at which heat is extracted from the chilled water circuit and transferred to the cooling water circuit by modulating the rate of flow of refrigerant through the cooling loop. When the system is controlled properly, and the positions of control valves 121, 131, and 141 are set properly, all system constraints would be satisfied. Thus, the cooling capacity of the system would meet a desired cooling setpoint, the heating capacity of the system would simultaneously meet a desired heating setpoint, and the generator turbine would be producing a desired power output.

Unfortunately, however, prior attempts have failed to provide an automated control that can reliably meet all of these constraints, simultaneously. As a result, prior art controls for such a tri-generation systems typically require a user to pre-select a mode of operation for the control. For example, a user may preselect whether the control is to operate in a cooling mode or in a heating mode. In an exemplary cooling mode, a conventional control may modulate the position of energy input valve 141 based on only a prescribed chill water set point such that the adjustment of the position of energy input valve 141 depends only upon the deviation of produced cooling capacity from the demanded cooling setpoint. Accordingly, the position of energy input valve 141 is not affected by changes to hot water temperature. Similarly, in a conventional control operating in heating mode, the modulation of energy input valve 141 may depend only upon the deviation of produced heating capacity from the demanded hot water set point without regard for its effect on chilled water temperature.

Unfortunately, a substantial drawback of conventional tri-generation systems is that they must typically be pre-set so as to be controlled, or to operate, in either a cooling mode or a heating mode, and the task of switching between modes can be problematic. The necessity to pre-select either a heating control mode or a cooling control mode has been found to be impractical when and where switching between modes may be required one or more times within a single day—such as in moderate climates or during moderate seasons. Accordingly, a demand exists for an absorption chiller that can simultaneously (i.e., without switching between two mutually-exclusive modes such as a cooling-only mode and a heating-only mode) be controlled or operated in both heating mode and cooling mode, i.e., so as to simultaneously produce desired levels of both heating and cooling.

Therefore, in addition to the simplified approach described above, a number of attempts have been made to better accommodate concurrent demand for both heating and cooling. For example, previous attempts to control a tri-generation system include a hierarchy of control modes. One such control system includes a so-called priority-override control and a separate capacity control. In accordance with such control schemes, a priority-override controller may manipulate hot water valve 131 and chilled water valve 121 according to whether the system is pre-set for heating priority or cooling priority.

In cooling priority, when cooling capacity is less than cooling setpoint minus cooling override, cooling priority override is active. In accordance with this scheme, control error to be minimized is the difference between actual cooling capacity and desired cooling, or setpoint. The control modulates the position of chilled water valve 121 so as to reduce that control error, i.e., such that the actual cooling capacity meets the setpoint. At the same time, the control may modulate the position of hot water valve 131 in a compensating manner. In a corresponding heating priority mode, when heating capacity is less than heating setpoint minus heating override, heating priority override may be activated. Control error is heating capacity deviation from the heating setpoint, and the control opens or closes hot water valve 131 while adjusting the position of chilled water valve 121.

Alternatively, a tri-generation system may be controlled using a capacity control scheme. In a capacity control, hot water valve 131 is used to minimize the deviation of heating capacity deviation from a heating setpoint while chilled water valve 121 is adjusted so as to maintain sufficiently high hot water outlet temperature.

Nonetheless, while these and other control schemes have provided some improvements in the control of tri-generation systems, control instability remains a persistent issue, and attempts to simultaneously meet a demanded level of cooling and a demanded level of heating, have caused controls to experience difficulty finding appropriate positions for all three control valves. For example, when cooling and heating loops are controlled simultaneously, even when one mode is given priority over another mode, controls have been found to repeatedly switch between modes, such as the above-described priority override control and capacity control modes, resulting in control instability. This occurs, for example, when cooling capacity is greater than or equal to the difference between cooling setpoint and cooling override in cooling priority mode, or when heating capacity is greater than or equal to the difference between heating setpoint and heating override in heating priority mode, then control logic switches to capacity control where no priority override is active. As a result, both hot water temperature and chilled water temperature may oscillate in an unstable and unacceptable manner such that modulation of energy input valve 141 may be unable to continuously accommodate both cooling and heating demand. Put another way, using prior art control systems, the position of energy input valve 141 can only be effectively controlled based on either cooling or heating setpoint with hot water valve 131 and chilled water valve 121 being regulated based on heating and cooling setpoint—independently.

Thus, prior art controllers for simultaneous heating and cooling exhibit discontinuous behavior, with the discontinuity resulting from repeated switching (i.e., control oscillation) between control modes such as priority override and capacity control modes. It has also been discovered that independent control of hot water valve 131 and chilled water valve 121 in capacity control mode can result in oscillation due to strong coupling between the heating and cooling loops and differences between the dynamic response characteristics inherent in heating and cooling loops. As a result, prior art control schemes can be complicated and difficult to service in the field.

Accordingly, a need exists for an improved system and method for controlling an absorption chiller configured to simultaneously provide cooling and heating. More specifically, a need exists for an improved system and method for controlling an absorption chiller that can meet a priority cooling or heating demand while maintaining chilled water and hot water outlet temperatures and their associated control valves stable automatically—without violating chiller safe operating constraints.

BRIEF DESCRIPTION OF THE INVENTION

A system for controlling an absorption chiller configured to simultaneously provide cooling and heating comprises a feedback control loop for determining a desired adjustment to system cooling capacity based on a difference between a desired cooling capacity and a realized cooling capacity and a separate feedback control loop for determining a desired adjustment to system heating capacity based on a difference between a desired heating capacity and a realized heating capacity. The system also includes a multiple-valve controller for simultaneously adjusting an energy input valve position, a hot water valve position, and a chilled water valve position based on the desired adjustment to system cooling capacity, the desired adjustment to system heating capacity, and one or more performance maps characterizing relationships between cooling capacity and heating capacity and energy input valve position, hot water valve position, and chilled water valve position. In an exemplary embodiment, a system determines realized cooling capacity by monitoring a chilled water temperature. Similarly, an exemplary system may determine realized heating capacity by monitoring a hot water temperature. In accordance with the invention, the performance maps may characterize heating and cooling loop dynamic characteristics obtained from chiller dynamic testing. The multiple valve controller adjusts the energy input valve position, hot water valve position, and chilled water valve position based on a heat/cool priority parameter, and estimated total heat energy input to the chiller.

In an exemplary embodiment, a method for controlling an absorption chiller configured to simultaneously provide cooling and heating includes the step of obtaining a performance map characterizing heat energy input to cooling and heating loops as functions of energy input valve position, a hot water valve position, and a chilled water valve position. The step of obtaining a performance map may include maintaining the hot water valve in a substantially constant position. Similarly, the step of obtaining a performance map may include maintaining the chilled water valve in a substantially constant position and may also include determining a natural cooling split associated with a particular chiller configuration and/or determining time constants for cooling and heating loops

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is a block diagram showing an exemplary method for controlling a tri-generation system in accordance with the invention.

DETAILED DESCRIPTION OF THE INVENTION

To address these and other control problems, a novel system and method has been developed for controlling an absorption chiller configured to simultaneously provide cooling and heating. In accordance with an exemplary embodiment of the invention, a control system and method satisfies simultaneous demands for priority of cooling and heating, while automatically actuating control valves to regulate the cooling and heating capacity without violating a desired operating constraint, such as a constraint approximating a pre-defined operational envelope. As a result, the system and method enables the practical, effective, and stable control of a simultaneous tri-generation absorption chiller, wherein a combination of three control valves provides simultaneous control of heating and cooling output over the entire operating envelope from very low cooling load (high heating load) to full cooling load (no heating load) conditions. In accordance with the invention, there is no need for valve change over between cooling-only mode and heating-only mode in shoulder months, even when heating and cooling may be both needed within one day.

Figure 1:
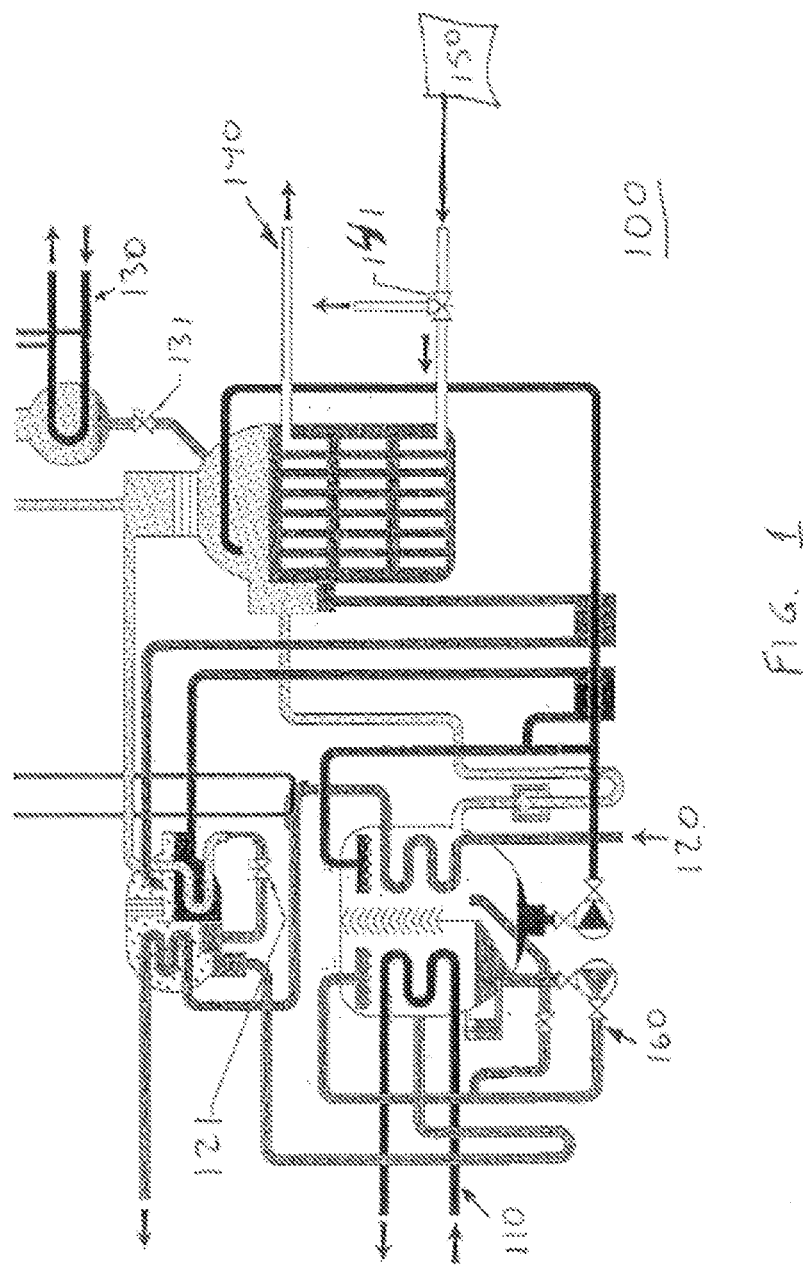
FIG. 1 is an exemplary tri-generation system.
Figure 2:
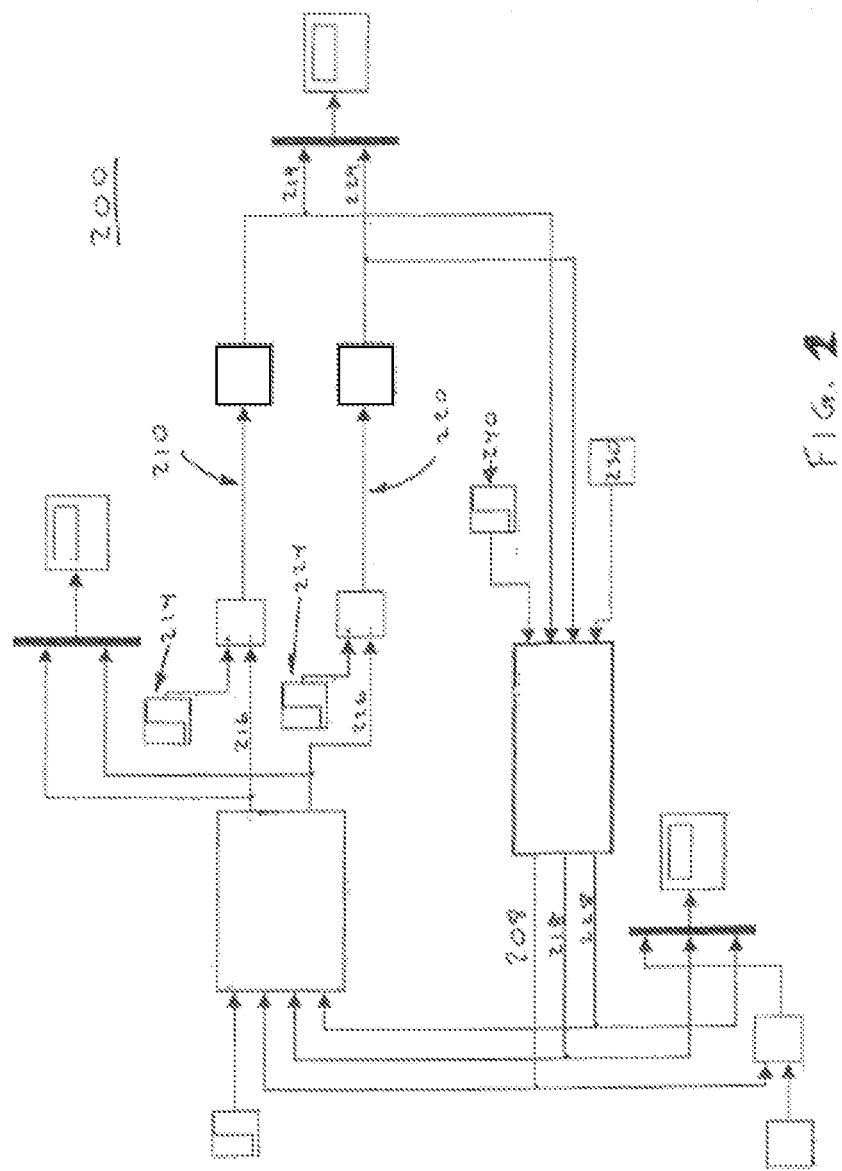
FIG. 2 is a schematic diagram showing an exemplary control for a tri-generation system in accordance with the invention.

FIG. 2 shows an exemplary control for a tri-generation system in accordance with the invention. As shown in FIG. 2, in accordance with an exemplary embodiment, a controller 200 includes distinct feedback control loops 210, 220 for determining cooling and heating input energy demand 219, 229 based on desired cooling and desired heating 214, 224. The controller 200 monitors actual cooling capacity 216 and heating capacity 226 and modulates control valves 208, 218, 228 based on those monitored capacities. The control commands positions for the controlled valves based on outputs from the feedback loops, a heat/cool priority parameter 230, and an estimated total heat energy input 240 to the chiller. Using feedback, the control 200 can self-adjust so as to tolerate variations in heat input estimations, valve position mappings, and plant model parameters. The valve position mappings enable the control to predict second-order effects of changes in valve positions.

As a result, an exemplary control system and method effectively decouples linear cooling and heating loops that may otherwise invoke nonlinear, discontinuous or unsteady valve actuations. In accordance with this embodiment, separate feedback loops 210, 220 for heating and cooling provide desired cooling and heating loop heat energy input 219, 229, while tuning is based on the heating and cooling loop dynamic characteristics obtained from chiller dynamic testing. Commanded positions for the three control valves 208, 218, 228 are determined using outputs from the two feedback loops 219, 229, a heat/cool priority parameter 230, and estimated total heat energy input to the chiller 240. The calculated valve positions are based on a performance map obtained from chiller dynamic testing as described below and can be generalized to any other chillers. The designed feedback control loops are robust to self-adjust variations in heat input estimations, valve position calculations, and plant model parameters. Accordingly, the system and method can successfully decouple linear cooling and heating loops with nonlinear valve actuations.

FIG. 3 is a block diagram showing an exemplary method for controlling a tri-generation system in accordance with the invention. As shown in FIG. 3, an exemplary method 300 for controlling an absorption chiller configured to simultaneously provide cooling and heating includes the step 310 of obtaining performance maps (i.e., control valve characteristics) of heat energy input to cooling and heating loops as functions of the positions of the three described control valves. To obtain such performance maps, all of the control valves are set 311 to an initial position, and the chiller is operated 312 at a range of valve positions while chiller performance is monitored 313. For example, to obtain a first map, data may be acquired to characterize chiller cooling capacity as a first valve is modulated 314 and second and third valves are held in constant positions and a set of data acquired 315 over the range of positions of the first valve. Then, positions of the second and/or third valves may be adjusted 316, 318. This process can then be repeated 317, 319 to map the performance of the chiller across the range of settings for all three valves.

In accordance with this embodiment, chiller test data may be used to isolate the effect of movements in the chilled water valve on the relative portion of heat energy input to cooling and heating loops, all while the hot water valve is held in a constant position, such as a fully open position. Accordingly a relationship between approximate portion of heat energy input to cooling and heating loops as a function of chilled water valve position, at constant hot water valve position, can be determined. One skilled in the art will appreciate that the fully open position is the saturation valve position such that the maximum flow rate occurs at that position.

Similarly, chiller test data may also be used to isolate the effects of movements in the hot water control valve on the approximate portion of heat energy input to cooling and heating loops, all while the chilled water valve is held in a constant position, such as a fully open position. In this way, a relationship between approximate portion of heat energy input to cooling and heating loops can be determined as a function of hot water valve position at constant chilled water valve position.

Additionally, chiller test data may also be used to determine the natural cooling split associated with a particular chiller configuration. To determine such a split, both the hot water valve and the chilled water valve may be held at constant positions, such as their fully open positions. In this way, a natural cooling split can be determined that is indicative of the distribution of energy input to cooling and heating loops when there is no flow restriction for both the hot water valve and the chilled water valve. In an exemplary embodiment, a natural heat split may be determined based on chiller testing.

Dynamic testing can be used to determine performance characteristics over a full range of heat input levels and positions of the three control valves. For example, dynamic testing can be used to determine time constants for cooling and heating loops as well as separate performance map characterizations for energy to the cooling loop and the heating loop as a function of total heat energy input and positions for the three control valves.

As one skilled in the art will appreciate, the above-described control valve characteristics may be stored for use in a variety of formats such as tabular data, polynomial curves, a combination of these, or any other suitable means. One skilled in the art will also appreciate that the above-described empirical method for developing the data could also be replaced by other methods.

In an exemplary embodiment, a method for controlling an absorption chiller configured to simultaneously provide cooling and heating also includes the step of commanding 330 a control valve positions based on the above-determined control valve characteristics. One skilled in the art will appreciate that requisite valve positions can be determined 320 from the described characteristics such as by iteration, direct table lookup, and/or calculation such that positions for the three control valves are based on proportion of heat energy input to cooling loop and heating loop, total heat energy input, and heat/cool priority. Those skilled in the art will appreciate that total heat energy input may not be measured directly but rather may be estimated based on the known or predicted operating characteristics for the specific system, or can be estimated by other means based on the actual source of the heat energy input. In a reverse mapping, one or more of the control valves may be prescribed to be fully open to a maximum position so as to simplify the calculation. Accordingly, the positions of the control valves may be reliably controlled based on total heat input, the desired heat input to the cooling loop, the desired heat input to heating loop, and optionally, a priority.

In an exemplary embodiment, a method for controlling an absorption chiller configured to simultaneously provide cooling and heating also includes the step of obtaining 340 desired heating energy inputs to cooling loop and heating loop. These heating energy inputs may be obtained from the output of the two controllers. The tuning is based on open loop chiller dynamic testing. The control includes saturation limiting feature and anti-windup mechanism.

In an exemplary embodiment, a method for controlling an absorption chiller configured to simultaneously provide cooling and heating also includes the step of integrating 350 the controllers over a range of valve positions. In an exemplary embodiment, these relationships may be nonlinear with respect to valve position.

In an exemplary embodiment, control system and method determines 320 and commands 330 the three valve positions simultaneously so as to avoid oscillation of the commanded valve positions which could otherwise occur due to strong coupling effect when controlled independently. This also allows an energy input valve to accommodate both cooling and heating demand. The procedure for determining 320 valve position addresses the nonlinear relationships between valve positions and allocation of energy to cooling and heating loops. The feedback control in the loop enables control robustness to self-adjust variations in heat input estimations, valve position calculations, and plant model parameters. Even though the control parameters are obtained from one simultaneous chiller testing, the fundamental control principle can be extended to any other chillers having simultaneous cooling and heating loops with minor parameter adjustment.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for controlling an absorption chiller configured to simultaneously provide cooling and heating comprising:
    a cooling feedback control loop for determining a desired adjustment to system cooling capacity based on a difference between a desired cooling capacity and a realized cooling capacity;
    a heating feedback control loop for determining a desired adjustment to system heating capacity based on a difference between a desired heating capacity and a realized heating capacity; and
    a multiple-valve controller for simultaneously adjusting an energy input valve position, a hot water valve position, and a chilled water valve position based on the desired adjustment to system cooling capacity, the desired adjustment to system heating capacity, and one or more performance maps characterizing relationships between heat energy input to cooling at a plurality of energy input valve positions, hot water valve positions, and chilled water valve positions and characterizing relationships between heat energy input to heating at a plurality of energy input valve positions, hot water valve positions, and chilled water valve positions.

2. A system as in claim 1, wherein the system determines realized cooling capacity by monitoring a chiller water temperature.

3. A system as in claim 1, wherein the system determines realized heating capacity by monitoring a hot water temperature.

4. A system as in claim 1, wherein the performance maps characterize heating and cooling loop dynamic characteristics obtained from chiller dynamic testing.

5. A system as in claim 1, wherein the multiple valve controller adjusts the energy input valve position, hot water valve position, and chilled water valve position based on a heat or cool priority parameter, and estimated total heat energy input to the chiller.

* * * * *